United States Patent [19]

Piringer

[11] 4,035,616

[45] July 12, 1977

[54] DEVICE FOR THE JOINT EVALUATION OF SEVERAL CYCLIC PROCESSES

[76] Inventor: Fritz Artur Piringer, Graf Starhemberggasse 13, Stiege 10/15, A-1040 Vienna, Austria

[21] Appl. No.: 559,470

[22] Filed: Mar. 18, 1975

[30] Foreign Application Priority Data

Mar. 18, 1974 Austria .............................. 2187/74

[51] Int. Cl.² .................................. G06C 27/00
[52] U.S. Cl. ........................ 235/78 RC; 235/88 RC
[58] Field of Search ............ 235/88, 78, 79, 85 RC, 235/77, 83, 89 R, 79.5

[56] References Cited

U.S. PATENT DOCUMENTS

| 655,653 | 8/1900 | Gnau ................................. 235/88 |
| 1,435,512 | 11/1922 | Boggio ............................... 235/88 |
| 2,423,822 | 7/1947 | Auerbach ........................... 235/78 |
| 3,253,780 | 5/1966 | Stewart et al. .................. 235/88 X |
| 3,460,508 | 8/1969 | Baxter ............................... 235/79 |

Primary Examiner—Ulysses Weldon

[57] ABSTRACT

Several transparent elements showing periodically-varying curves and a transparent element showing a date scale are superposed over each other and a ground element which shows a number of year scales of different length, subdivided from 0 to 100 years. The transparent elements are to be adjusted in respect to their position to said year scales according to a reference date and a desired reading date. The correct position of all curves and their inter-relationship are immediately visible i.e. without any foregoing use of the known mathematical tabulations which are standard e.g. in the biological rhythm field.

4 Claims, 29 Drawing Figures

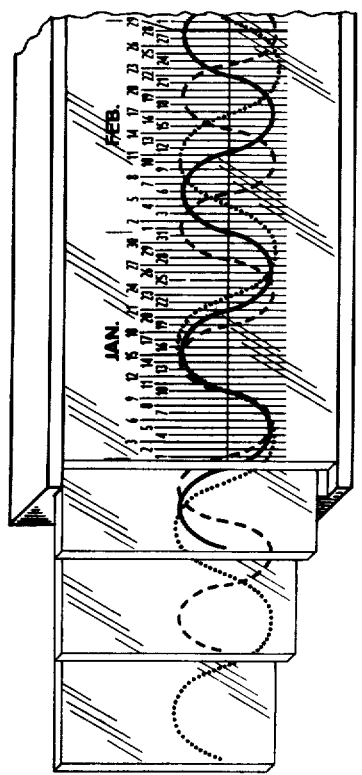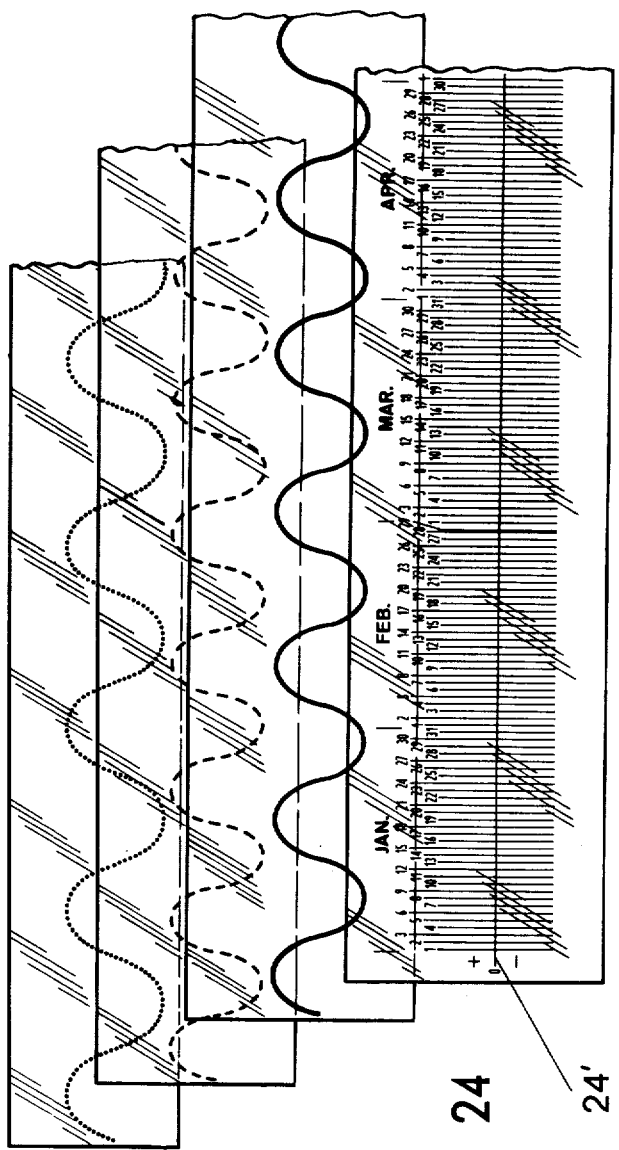
Fig. 22  Fig. 23  Fig. 24

DEVICE FOR THE JOINT EVALUATION OF SEVERAL CYCLIC PROCESSES

The present invention relates to a device for the joint evaluation several cyclic processes, each of the cyclic processes being drawn as a continuous curve. Each continuous curve is drawn on a separate transparent element and consists of a number of consecutive cycles, said transparent elements arranged close to each other and movable independently of each other. The joint course of all positive and negative phases of the curves can be seen for a long time interval. This can be seen at a glance but without the necessity of any calculating work. Direct reading of the exact date e.g. of the conjunction of two or more curves, of their intersections with the zero line of the diagram, of maxima, minima, oppositions, intersections in the negative phases etc. is achieved.

Prior proposals for similar purposes showed constructions making use of gears. Moreover, the transmission factors for such gears were settled especially for the calculation of cycles of 23, 28 and 33 days only. In the Austrian Pat. No. 186.434 (Höfner) a gear moving 8 opaque discs of different diameters has been suggested. In the additional Austrian Pat. No. 195.669 (Höfner) another gear moves 3 opaque discs of different size driven by a common friction roller. The French Pat. No. 1,187.506 (Weber) suggests a gear with six cog-wheels and three opaque discs connected to them, the opaque discs arranged one upon another and having scales figures, each of them showing a single period of 23, 28, or 33 days length. In the Swiss Pat. No. 339.758 (Weber) a gear consisting of eleven rollers and one clutch is used to move four endless transparent films, showing curves or rows of figures respectively. According to Swiss Pat. 530.055 (Eggerman) a casing contains three perforated films of different length with depictured curves on them, which are moved by a common cog-wheel and are kept under tension by special diverting elements.

It is a common disadvantage of all the prior art, that mechanical parts are needed for the gear, that the wheels of such gears always have to execute a certain number of turns before they finally come to the proper setting for a certain position coordinated to a certain day i.e. the desired date. The wheels of such gears have to be situated in a housing, therefore such apparatus are expensive and could not find their way to practical use in daily life. A special disadvantage of all the prior suggestions can be seen in the fact, that the visible space of time which could be surveyed by use of such gears has been 10 to maximum 33 days.

It is an object of the present invention to provide a device without any gear, and without any mechanical transmission parts. The gears according to the prior art are expensive, and have a certain volume and weight. The most simple form of execution of the present invention is a flat device comparable to the known slide-rules. It is a further object of the present invention to avoid the tabulations for mathematical operations and to save costs and time. The handling of a device according to the present invention is very easy — like handling a slide-rule.

Another object of the invention lies in improving the visible space of time from the maximum of 33 days in the prior art to now one year, and in creating a general principle that can be applied for all other periodical or cyclic processes e.g. with long periods too.

A further object of the present invention is to improve the clearness of the diagram consisting of several curves by means of additional signs to mark certain points of each curve e.g. the change from the positive phase to the negative phase in which the amplitude for a short time possesses the value "zero". In addition, the present invention provides colored zones for negative phases.

In one embodiment the present invention comprises an opaque round ground element carrying several year scales of different length, each of said year scales subdivided into intervals from 0 to 100 years. Said year scales proceed from a joint curve line in two directions. A first transparent element superposed over said ground element shows an opaque date scale for one year and co-acts with said joint zero line of the ground element. A second transparent element superposed over the first transparent element is coordinated to the first year scale of said ground element and has a setting mark co-acting with said first year scale and shows consecutive cycles drawn as a continuous curve. A third transparent element is superposed over the second transparent element and is coordinated to the second year scale of said ground element and has a setting mark co-acting with said second year scale and shows consecutive cycles drawn as a continuous curve. A fourth transparent element superposed over the third transparent element is coordinated to the third year scale of said ground element and has a setting mark co-acting with said third year scales and shows consecutive cycles drawn as a continuous curve. All of the said elements can be moved about their common axis.

According to another embodiment of the invention a device for the joint evaluation of several cyclic processes comprises a opaque disc-shaped ground element, carrying three different year scales proceeding from a joint radial zero line, one of these scales proceeding in opposite direction to the others. Each of the three year scales show intervals from 0 to 100 years and shows differences in the interval width of those scale intervals which are coordinated to each leap year — according to the natural sequence of three common years and one leap year. A first transparent element shows an opaque date scale for one year but subdivided into 365.25 days of the astronomical year. Said date scale co-acts with said joint radial zero line of said ground element. A second transparent element shows — in a known manner — an opaque periodically-varying circular curve and is coordinated to the first year scale of said ground element by means of a setting mark co-acting with said first year scale. A third transparent element shows another opaque periodically varying circular curve and is coordinated to the second year scale of said ground element by means of an own setting mark co-acting with said second year scale. A fourth transparent element shows another opaque periodically varying circular curve and is coordinated to the third year scale of said ground element by means of a setting mark co-acting only with said third year scale. Said ground element and said four transparent elements are secured together by known means e.g. a split rivet.

According to a further embodiment of the invention the device comprises a ground element carrying a radial zero line only and a first transparent element superposed over said ground element which shows an opaque date scale for one year subdivided into 365.25 days co-acting with said radial zero line of said ground element. A second transparent element superposed over said first transparent element shows an own opaque year scale from 0 to 100 years co-acting with said radial zero line of said ground element and further carrying consecutive cycles drawn as continuous curve. A third transparent element superposed over said second transparent element shows an own opaque year scale from 0 to 100 years, proceeding in the opposite direction in respect of the said year scale of said second transparent element and co-acting with said radial zero line of said ground element and further carrying consecutive cycles drawn as continuous curve. A fourth transparent element superposed over said third transparent element shows an own opaque year scale from 0 to 100 years, proceeding in the same direction of the year scale of said second transparent element and co-acting with said radial zero line of said ground element and further carrying consecutive cycles drawn as continuous curve. All of the said elements are secured together and movable about their common axis which is e.g. split rivet.

In another embodiment the records of cyclic processes and the scales show a straight-lined lay out, the ground element and the transparent elements having the form of long small rectangles made of stiff material and being arranged for longitudinal shifting.

In yet another embodiment the records of the cyclic processes and the scales show rings-shaped form, the transparent elements showing the form of cylindrical barrels allowing nest formation and revolution around their joint geometrical cylinder axis of a cylindrical ground element located centrally.

The foregoing and other objects and features of the invention will be set forth with reference to the accompanying drawings, wherein FIG. 1 shows in top view a device consisting of an opaque ground element and four transparent elements.

FIG. 2 shows a vertical section A—B through the device as seen in FIG. 1.

In FIGS. 3 to 7 the elements of FIG. 1 are represented individually.

FIG. 22 represents a device in straight-line form.

FIG. 23 represents a side view of FIG. 22.

FIG. 24 represents in exploded view the elements of FIG. 22.

Figure 1:
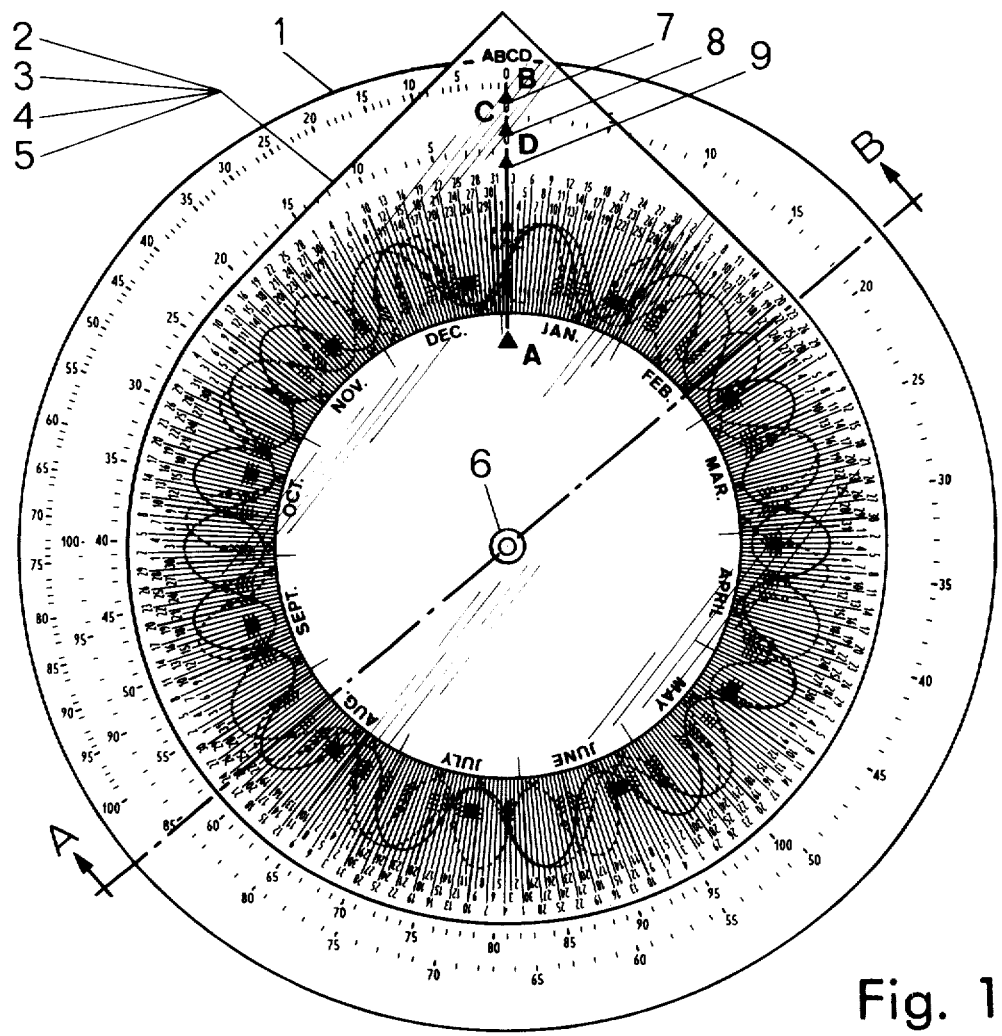
Figure 2:
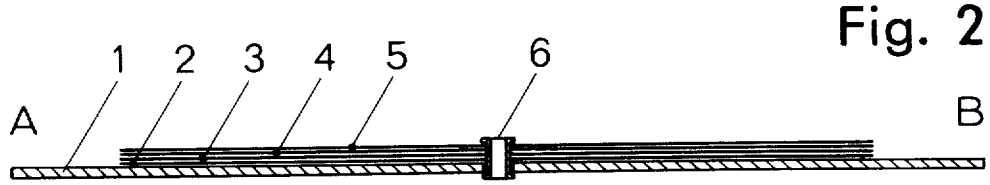
Figure 3:
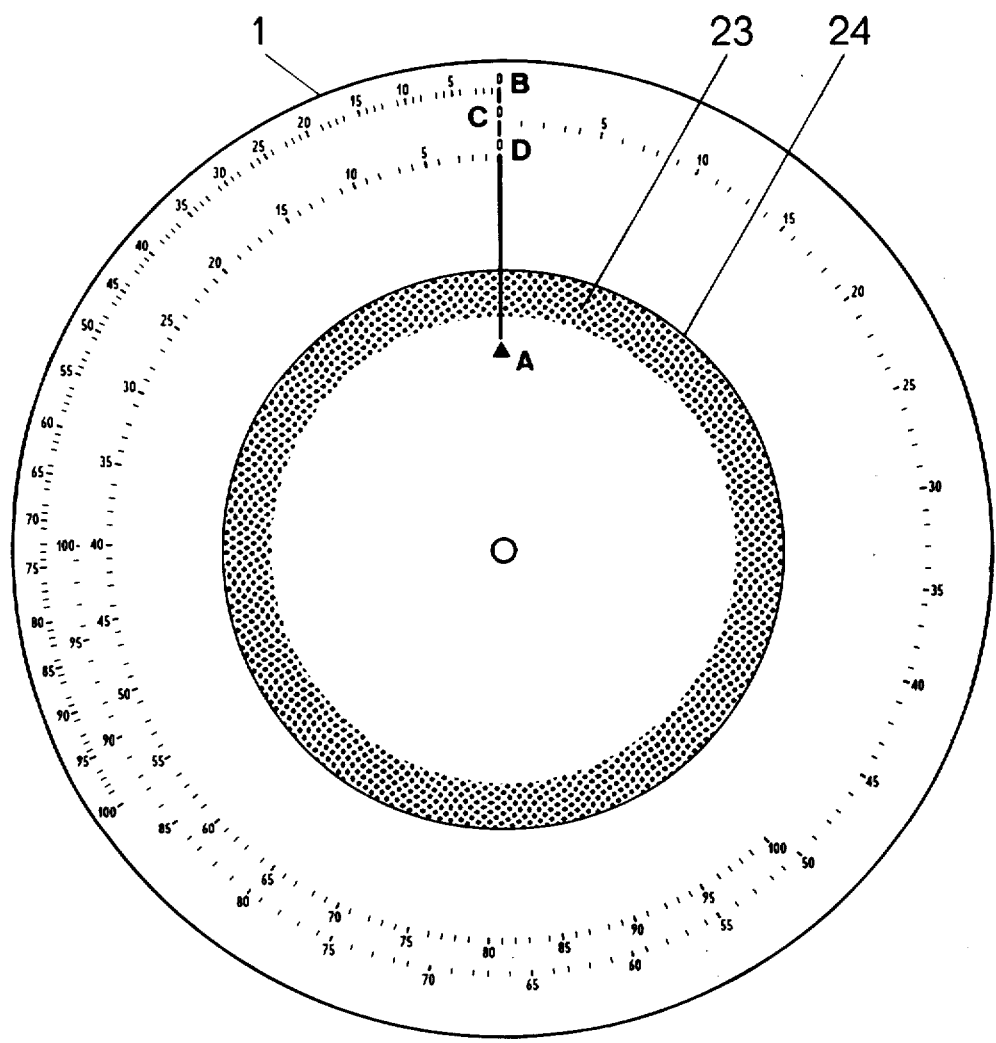
FIG. 3 shows a layout of an opaque ground element.
Figure 4:
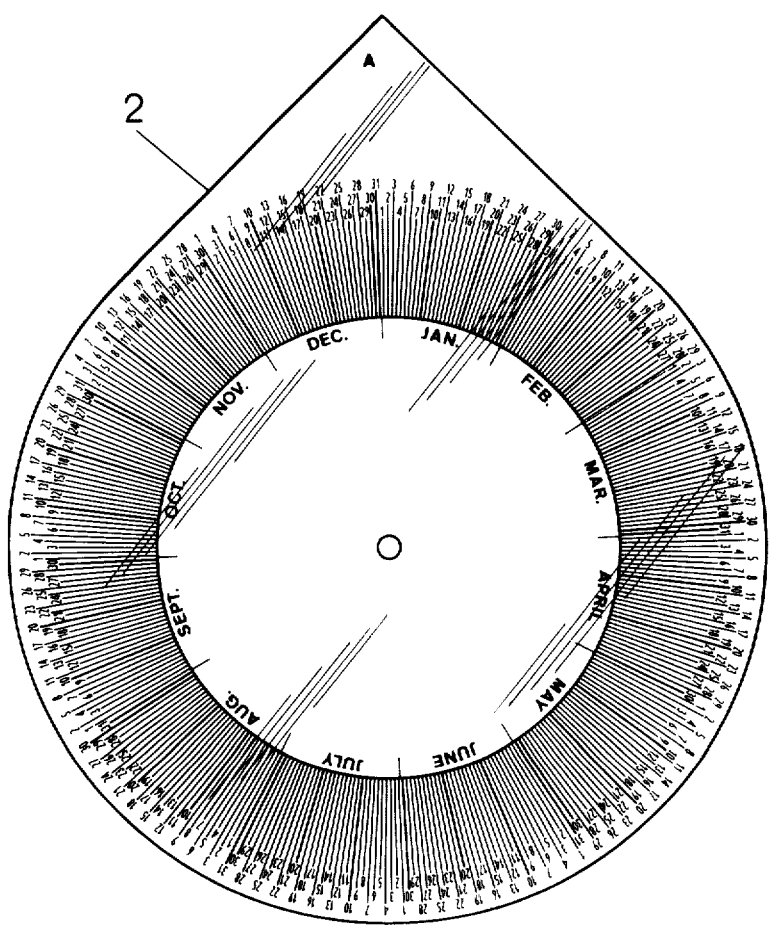
FIG. 4 shows a transparent element showing an opaque date scale.
Figure 5:
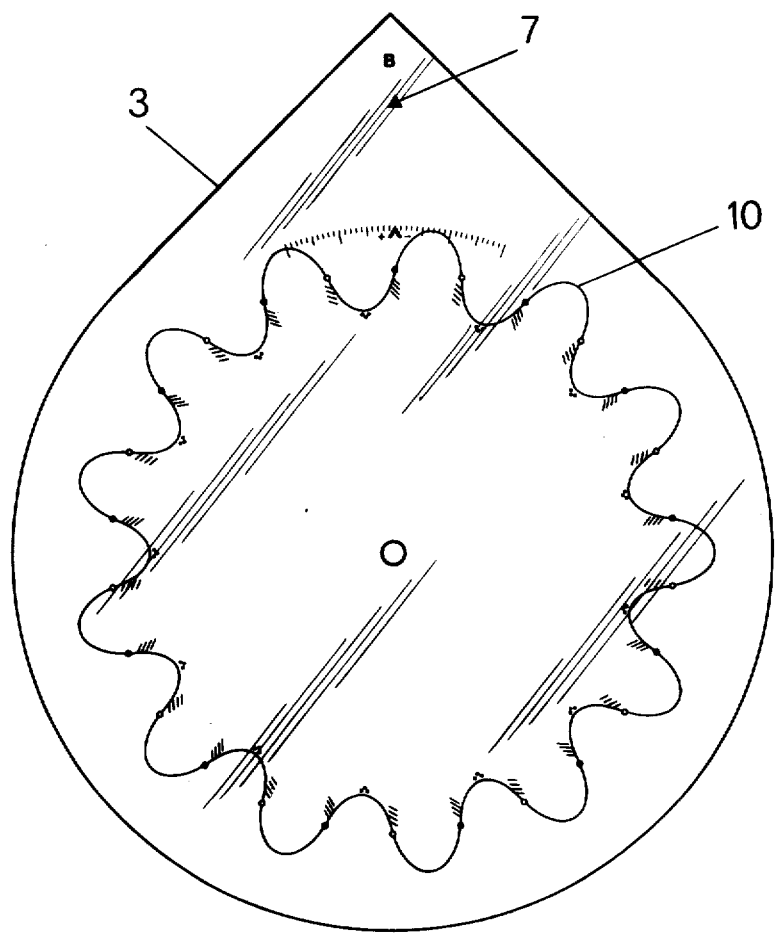
FIG. 5 shows a transparent element with opaque curves.
Figure 6:
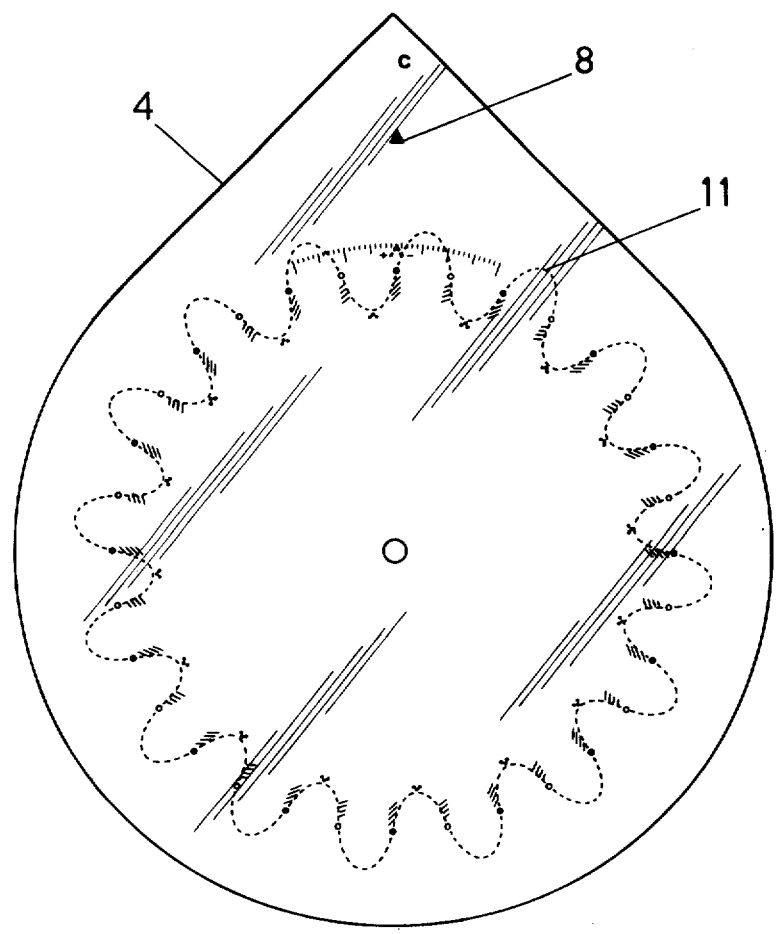
FIG. 6 shows a transparent element with dashed opaque curves.
Figure 7:
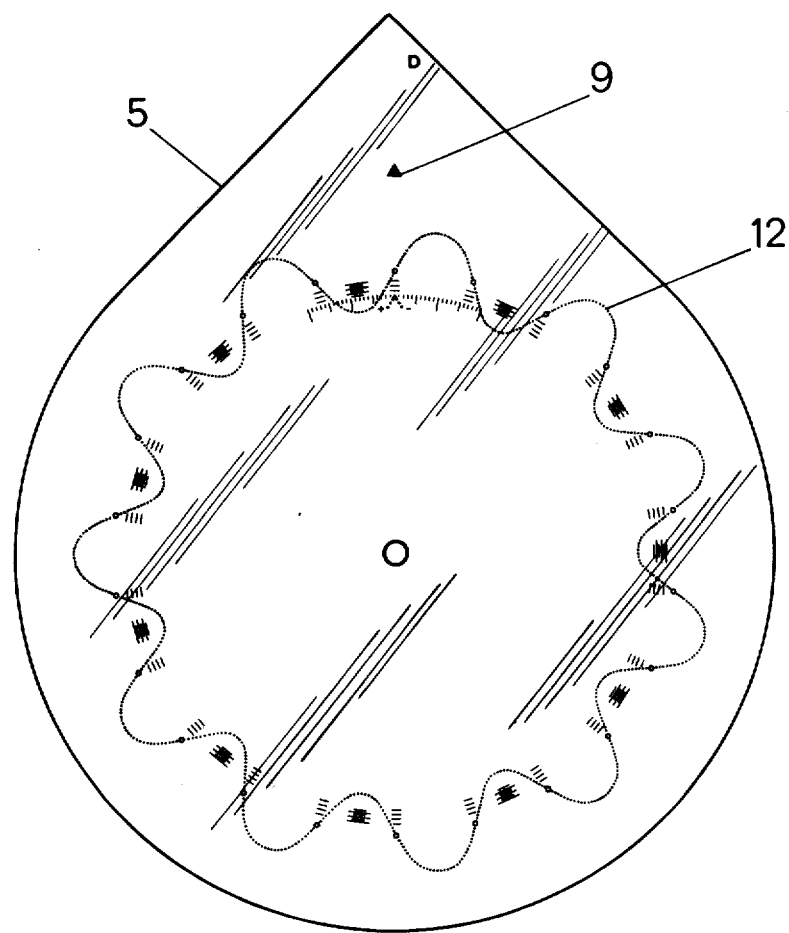
FIG. 7 shows a transparent element with dotted opaque curves.

In the Figures numeral 1 refers to a ground element, on which the transparent elements 2, 3, 4, and 5 are arranged. Said transparent elements 2, 3, 4, and 5 are linked with the ground element 1 by means of a hollow rivet 6 and each of the transparent elements 2, 3, 4, and 5 can be moved in circular direction independently from each other. The ground element 1 is made from transparent material too, but can be made from opaque material e.g. threefold bristol board, aluminum, synthetic resinus or other substances that can be printed or etched or moulded, to get the layout and the scales etc. In FIGS. 1 and 3 the ground element 1 possesses a setting mark "A" for the date which is found in the rotary date scale of the transparent element 2, e.g. printed in black color (FIG. 4). The ground element 1 is fitted with a year scale "B", which co-acts with the setting mark 7 of the transparent element 3 (FIG. 5). The ground element 1 further possesses a year scale "C", which co-acts with the setting mark 8 of the transparent element 4 (FIG. 6). The ground element 1 is also fitted with a further scale "D", which co-acts with the setting mark 9 of the transparent element 5 (FIG. 7). FIG. 1 shows said four transparent elements 2, 3, 4, and 5 in zero-position arranged upon the ground element 1. Further transparent elements and further scales could be arranged in the same way, if desired for other cyclic processes.

For an easier distinction during manipulation each transparent element carries the same letter as its coordinated year scale "B", "C", "D". The transparent element 2 possessing the date scale is marked "A" according to the setting mark "A" for the date which is arranged on the ground element 1. In zero position as shown in FIG. 1 the distinguishing letters will be found at the top in ABCD order.

Figure 26:
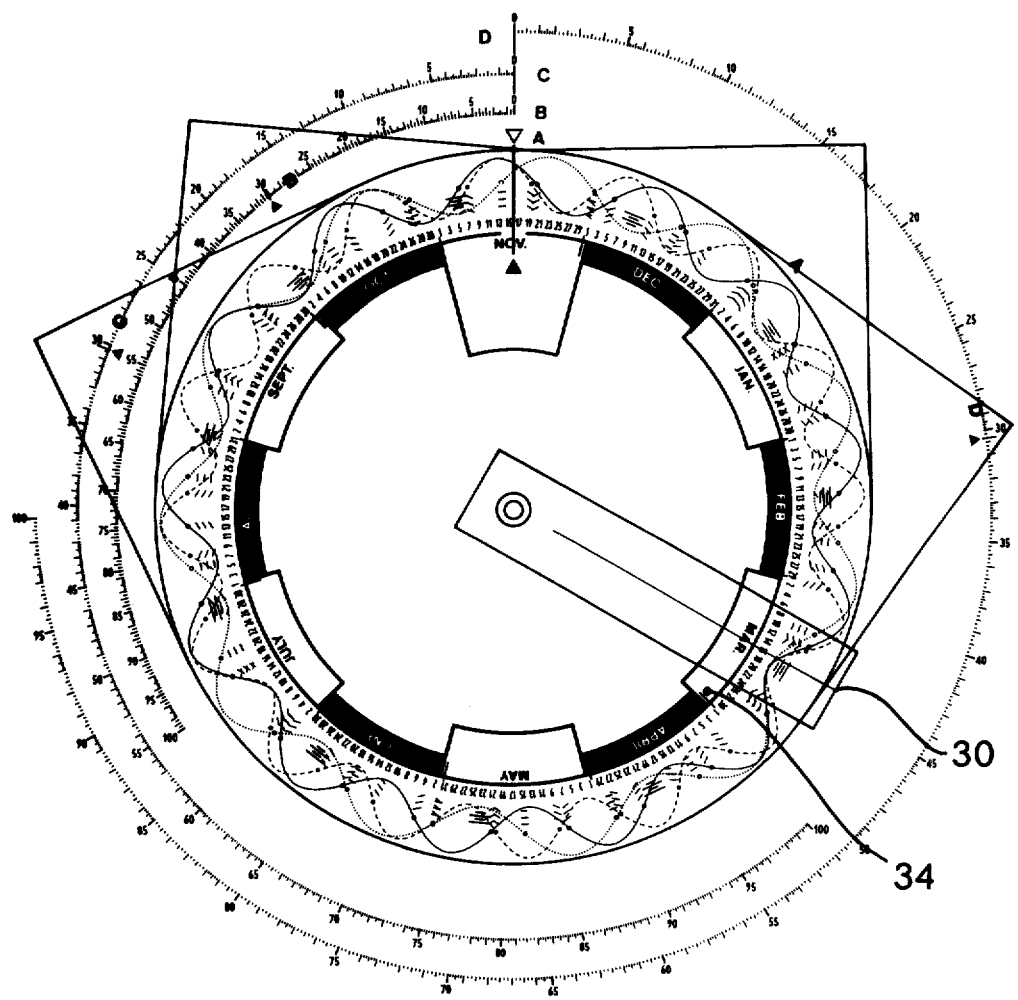
FIG. 26 shows in top view a circular execution of a ground element with three year scales, subdivided in smaller intervals, and a transparent element "A" with a date scale and a circle of months names, and three transparent elements "B", "C", "D" showing curves and a setting mark each, and an index-line — all in working position.

In another execution, shown in FIG. 26 the letters ABCD are placed close to the setting mark of the respective transparent element. In zero position said letters. A, B, C, D covers the letters which are arranged on the ground element beside the common zero line of all scales (FIG. 26).

The records of cyclic processes are undertaken in form of coherent, continuous curves 10, 11, 12. Every zero passage i.e. each intersection of a curve with the zero line 24 is suitably marked with one small geometrical FIG. 13, e.g. with a circle, a square, a triangle.

Figure 8:
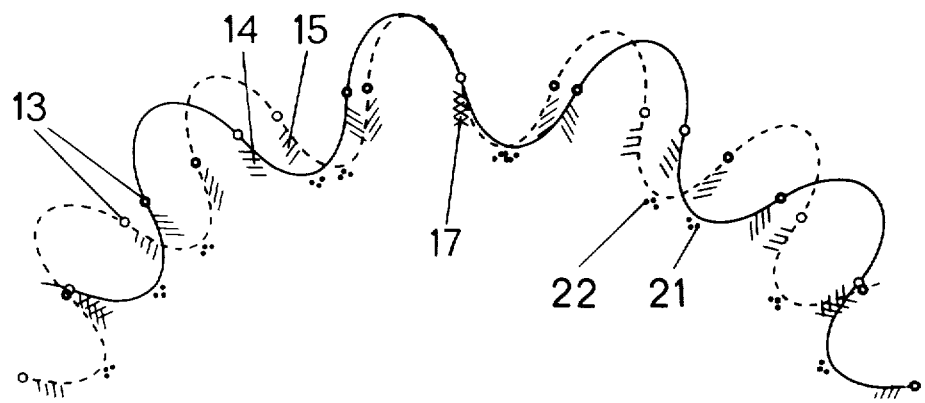
FIG. 8 shows in enlarged representation two curves with additional signs masking each other.
Figure 9:
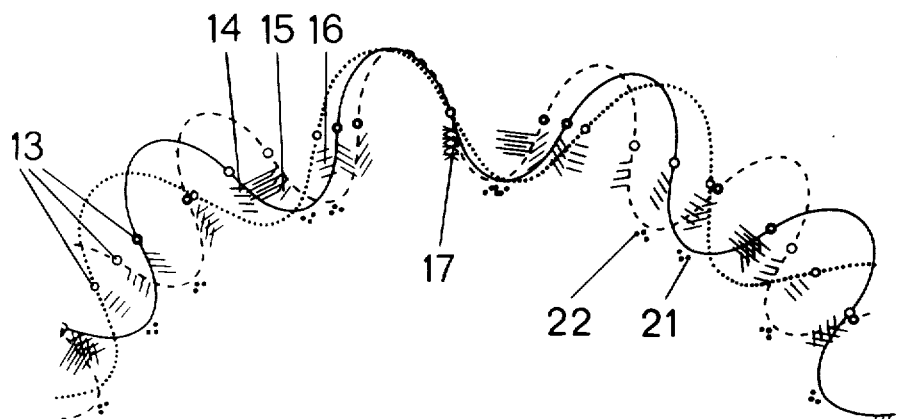
FIG. 9 shows in enlarged representation the co-action of the additional signs of three curves, showing darker places by masking each other.
Figure 10:
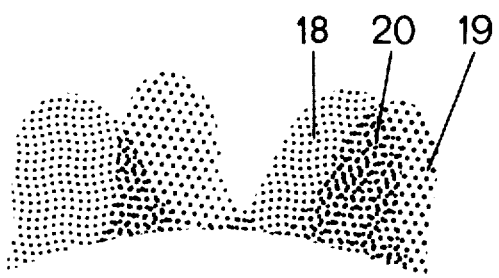
FIG. 10 shows in enlarged representation curve zones consisting of different grids and partially overlapping each other, thus showing darker zones.

So as to be able to recognize the exact coincidence of marked points on the curve, the invention provides hatched zones 14, 15, 16 along the curves. The direction of hatching is chosen differently for each curve and the angle of hatching as well as the interval between the lines has been chosen with respect to the desired effect. The more hatchings mask each other, the darker the relevant area will appear (e.g. area 17 in FIGS. 8 and 9). Grids 18, 19 may also be used for the same purpose and these will result in darker curve zones 20 within the overlapping areas (FIG. 10). Smaller groups of points 21, 22 can serve the same purpose or may additionally serve e.g. to characterize all minima or coincident minima of two or more curves respectively.

The curves themselves can be made of colored transparent material — punched from foil or extruded in plastic. The overlapping of such transparent colored curve zones results in subtractive mixed color zones having advantages over black/white grids (FIG. 10).

Figure 27:
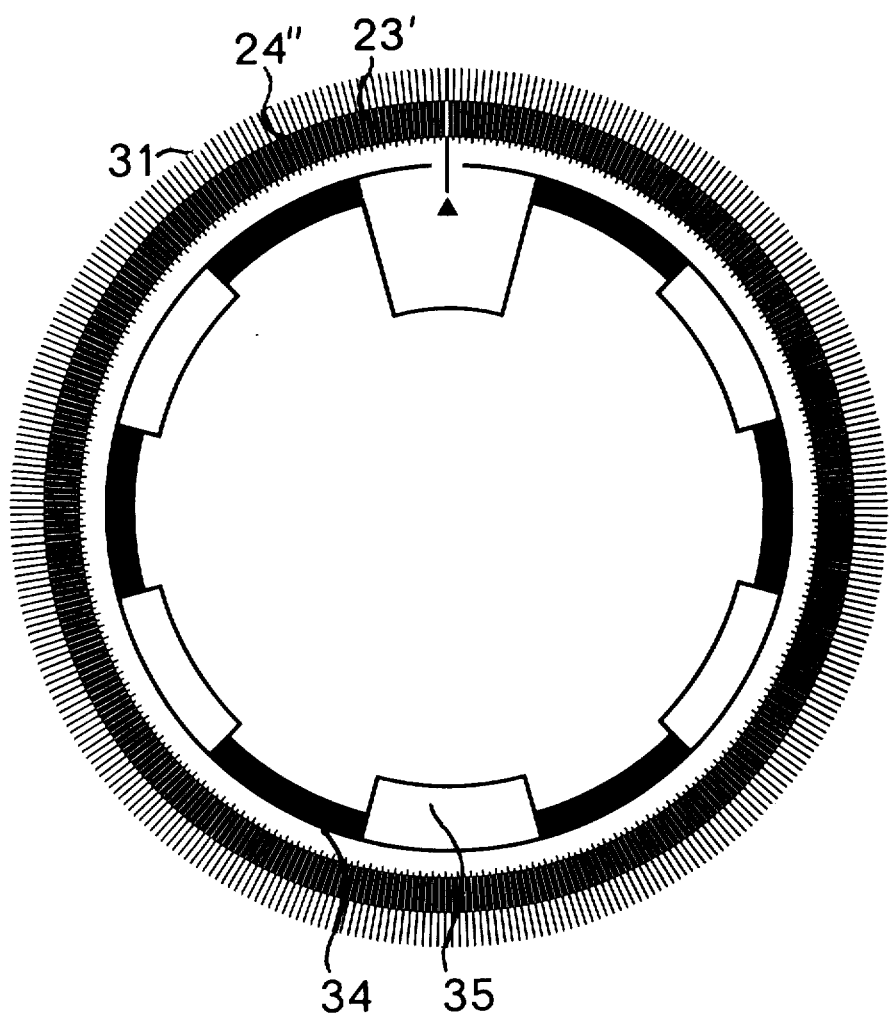
FIG. 27 shows a special layout of a ground element possessing a circular diagram with darker region for the negative phases within a special layout serving as colored ground for the names of the months.

The ground element 1 will suitably be designed with a colored area 23, starting at line 24 which has been designated zero value, the area 23 ranging over the field of all minus values i.e. all negative phases of the curves. This allows the viewer to see at a single glance, which cyclic processes are in their negative phase. According to form of execution of the invention (circular, straight-lined or ring-shaped zero line 24 with its minus range 23 is either given circular form on a disc (FIGS. 3, 27, 29) or the form of an oblong square zone or the form of a ring on a cylinder barrel respectively.

Figure 11:
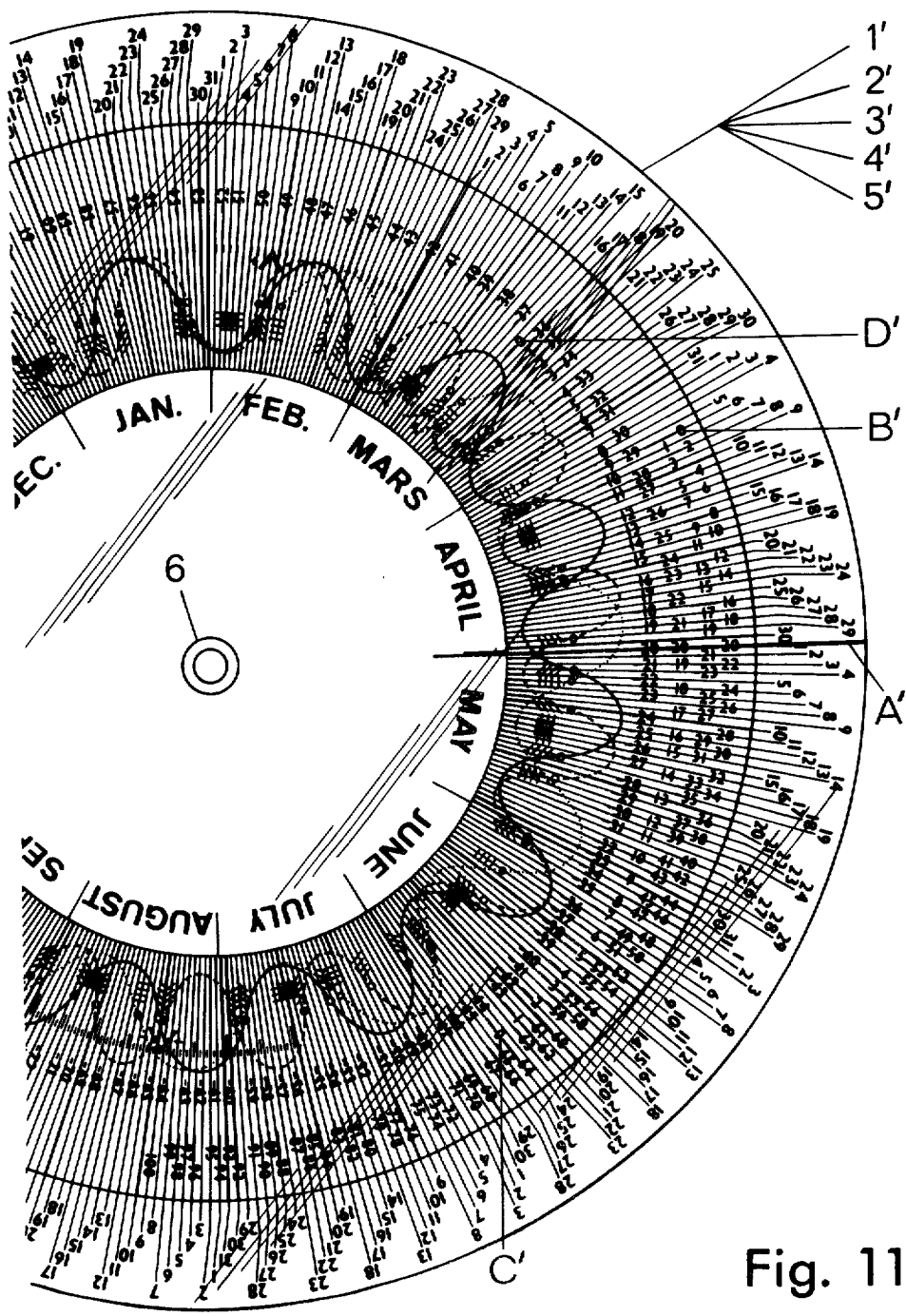
FIG. 11 shows in top view an enlarged area of a complete device similar to FIG. 1, the transparent elements possessing each an own year scale from 0 to 100 apart from the opaque record of the curves.
Figure 12:
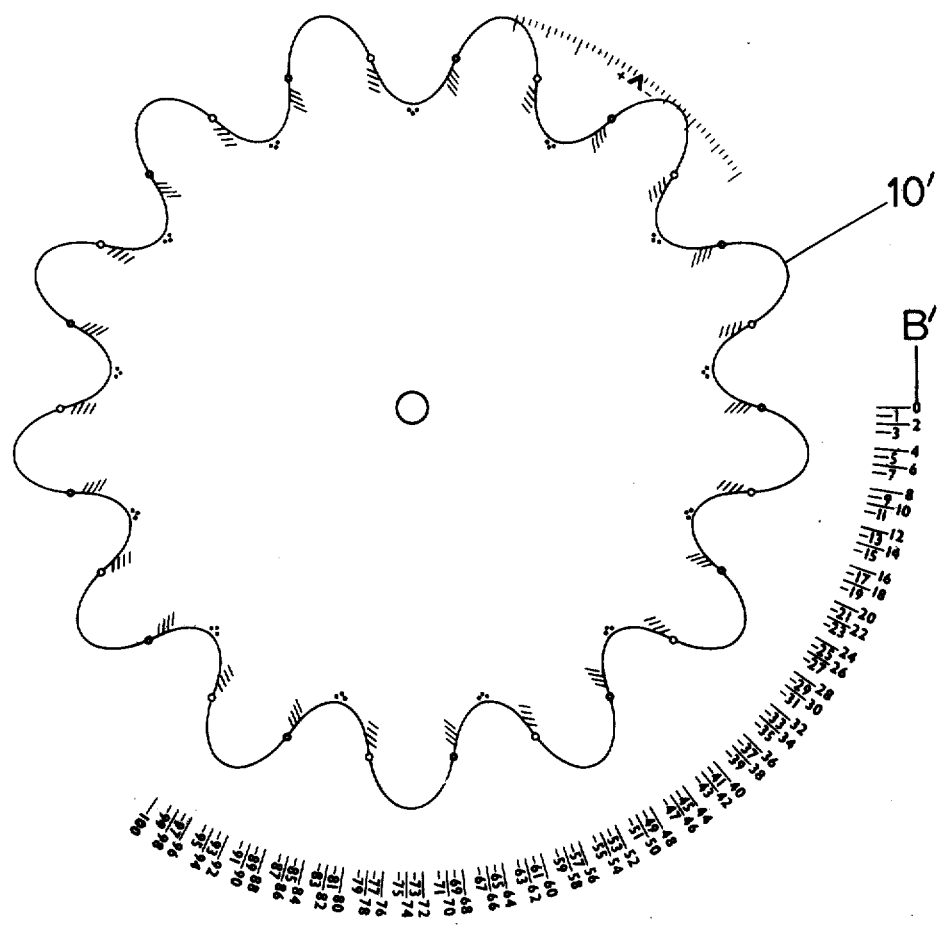
FIG. 12 shows in enlarged top view one opaque record of a transparent element of FIG. 11, possessing an own year scale from 0 to 100.
Figure 13:
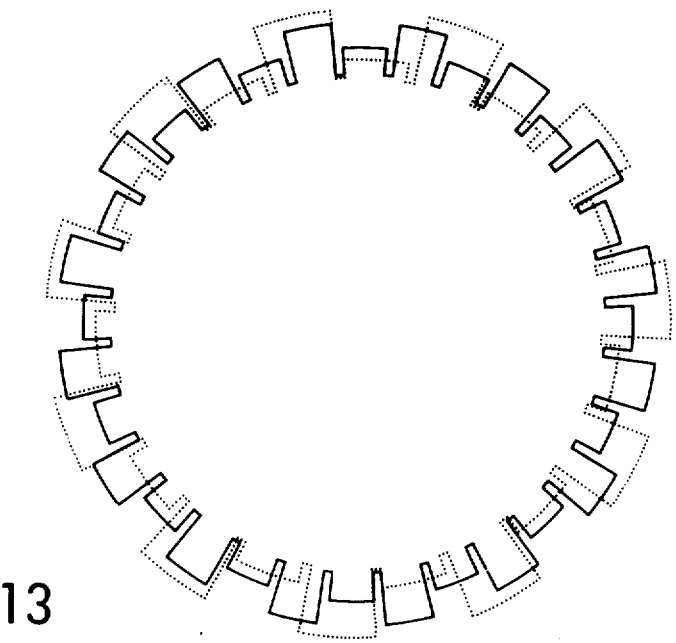
FIG. 13 shows the principle of angular records for cyclic processes.
Figure 14:
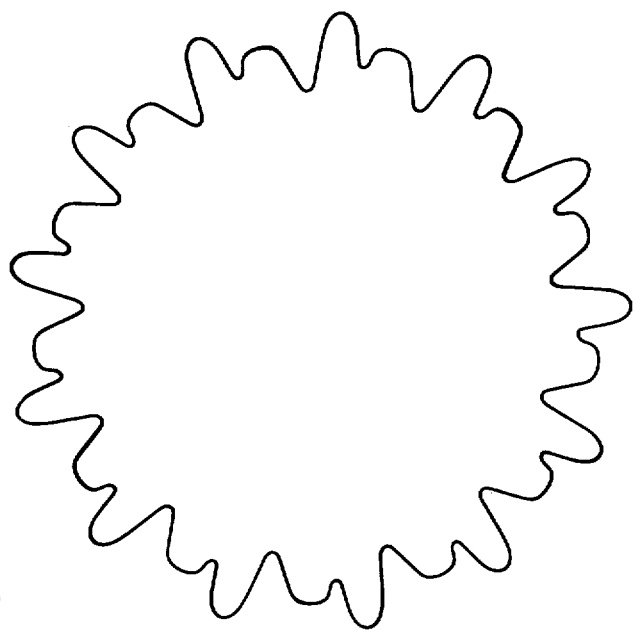
FIG. 14 represents a type of record for cyclic processes with secondary maxima.
Figure 15:
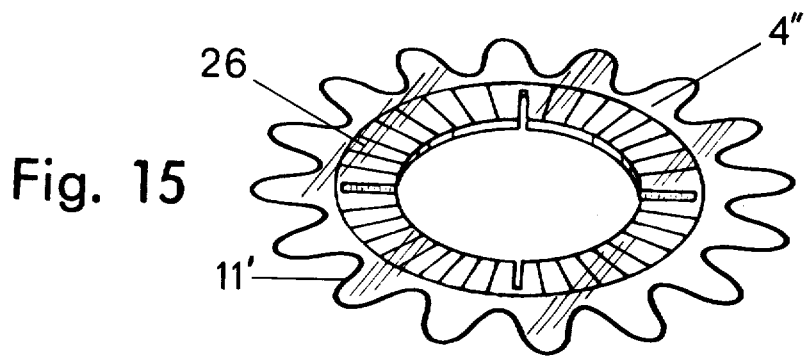
FIGS. 15 to 17 show three extruded transparent elements fitted with grip-zones for handling.
Figure 16:
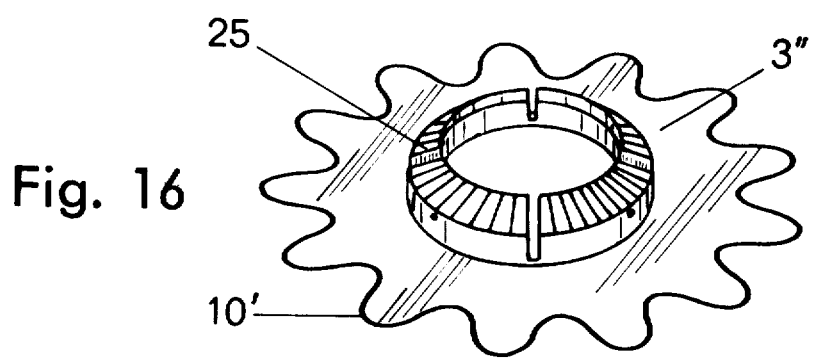

FIG. 12 shows a transparent element in enlarged view which is similar to the transparent element 3 in FIG. 5. The curve 10' in FIG. 12 is corresponding to curve 10 in FIG. 5, but in FIG. 12 there is no setting mark 7 because the transparent element of FIG. 12 possess an own year scale B' divided into intervals from 0 to 100 years. FIG. 11 shows said transparent element of FIG. 12 characterized by its year scale B' together with four other elements in top view. These other elements are: Ground element 1' possessing the radial zero line A' only, further the transparent element 2' possessing a date scale for 1 year as shown in FIG. 4, further said transparent element 3' of FIG. 12 (and analogously shown in FIG. 5) possessing an own opaque year scale B', further the transparent element 4' possessing an own opaque year scale C' (and analogously shown in FIG. 6), further the transparent element 5' possessing an own opaque year scale D' (and analogously shown in FIG. 7). FIG. 11 shows all elements together and one can see, that the year scale C' proceed in the opposite direction in respect of the year scales B' and D'. The setting at the radial zero line is made for "May 1, and an age of 20 years" as shown in FIG. 11. The opaque curves of the transparent elements 3', 4', and 5' are the same as shown in the FIGS. 5, 6 and 7 having the transparent elements 3, 4, and 5, possessing the opaque curves 10, 11, and 12. FIG. 13 shows the principle of records for cyclic processes in angular form having a common zero line in ringform for the high of the amplitude, said zero line in ringform is not drawn in FIG. 13 but is formed by the innermost parts of the dotted line. FIG. 14 shows a record of periodically-varying circular curves, each curve related to a (not drawn) innermost zero line in ringform for the high of all amplitudes. FIG. 14 shows a number of consecutive cycles, each cycle beginning at value zero at the innermost ring up to a maximum at the outermost ring. After said maximum the amplitude decreased to a value of ⅛ of said maximum and increases again to a so-called secondary maximum of approximately ⅝ of the possible maximum, and decreases from the flat top of the secondary maximum continuously to zero. FIGS. 13 and 14 show the possibility and the manner to use of other types of curves (and for other purposes) than the sinus-curves which in all other Figures extend symmetrically upwards and downwards from a zero line in the form of a ring in the half distance between the innermost and the outermost borderline of a diagram in circular form. Such zero lines are shown in FIGS. 3 (number 24) FIG. 17 (number 24") and in FIG. 29 (number 24'"). Analogous zero lines are shown in FIG. 24 (number 24', straight-lined form), and in FIG. 25 (without number) for a cylindrical form of a device. In an analagous manner the ring-shaped years scales B, C, and D of FIGS. 1 and 3 are to be executed in straight-lined form for devices as shown in FIGS. 22, 23, and 24. The geometrical principle of FIG. 1 is cut along the joint zero line A and the circle is opened in both directions and stretched to a straight band. Two zero lines appear in this way at the two ends of a straight-lined device as shown in principle FIGS. 22, 23, and 24. If this straight-lined execution is closed to a flat ring consisting of cylinders, the two zero lines are joined to one zero line (parallel to the vertical cut as shown in principle in FIG. 25). All details shown in round execution are in this geometrical way stretched and, if desired, closed to get cylinders as in FIG. 25. The principles according to the invention are the same for a circular, a straight-lined and a cylindrical execution. The most complicated execution is the circular execution and this is the reason why the examples are given for the circular form.

If the curves are extruded or pressed in colored transparent material, they are fitted with grip zones 25, 26, 27 for easy manipulation. Said grip zones are extruded or pressed in the same item with said curves, as is represented in FIGS. 15, 16, 17, 18.

Figure 17:
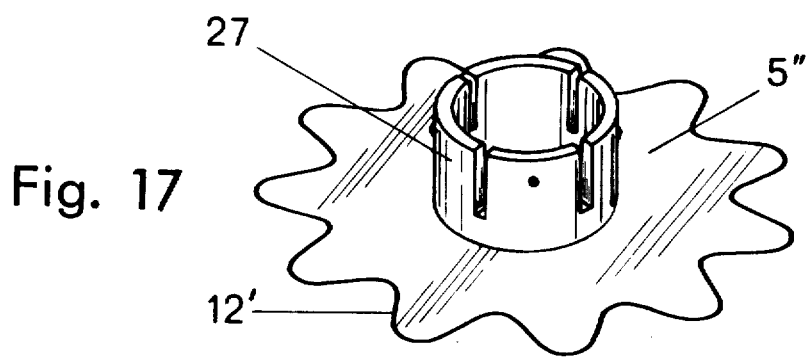
Figure 18:
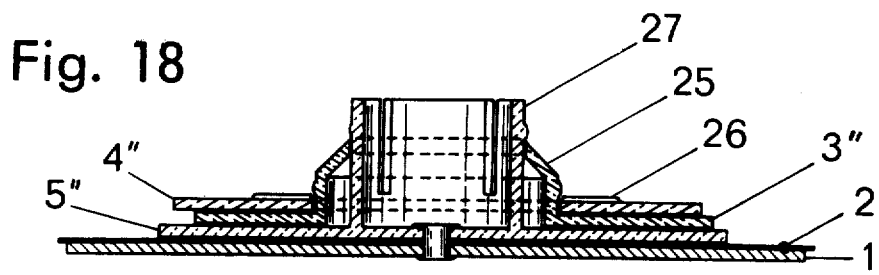
FIG. 18 shows in vertical section the three extruded transparent elements of FIGS. 15, 16, and 17, mounted in their common working arrangement on a ground element with a centrally located split rivet.
Figures 19, 20:
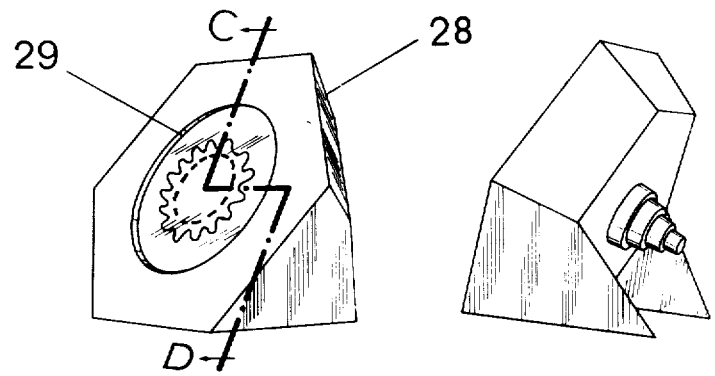
FIG. 19 shows an inclined front of a housing with a window behind which the transparent elements and an opaque ground element are arranged.
FIG. 20 shows the back of the housing represented in FIG. 19 with several operating members projecting from it.
Figure 21:
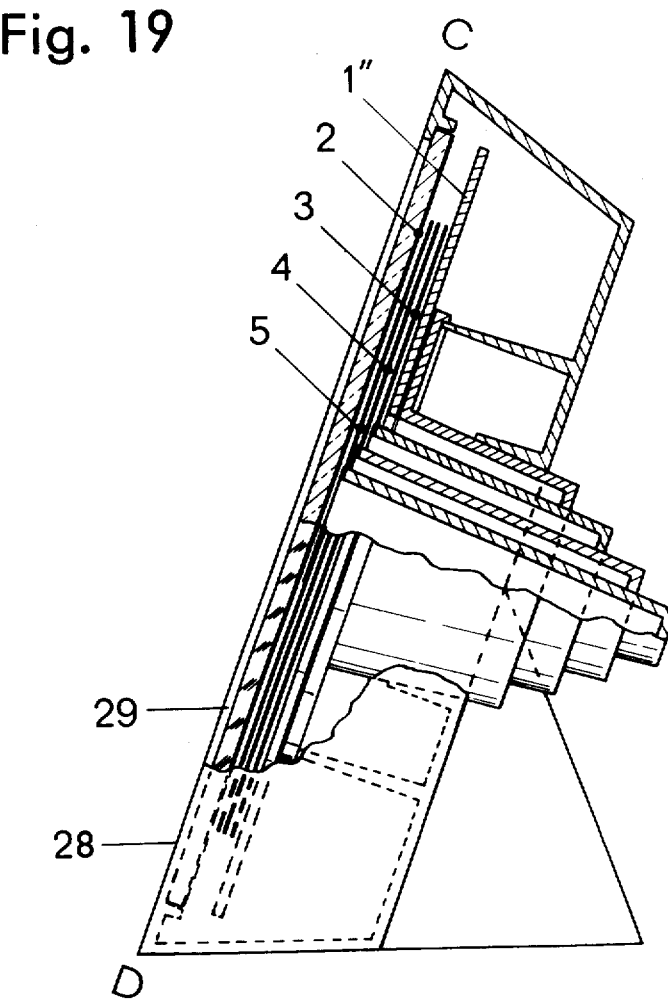
FIG. 21 shows a section C–D through the housing and the operating members shown in FIGS. 19 and 20.

If it is desired to arrange all elements in a housing 28, the execution illustrated in FIGS. 19, 20 and 21 has been found favorable. The grip zones 27 of FIG. 17 are for use in a housing re-arranged as operating members, fitted within each other and showing different length. For reasons of extrusion and so to achieve good seating these operating members have been given conical form. In FIG. 21 a big operating member is coordinated to a ground element 1". The transparent elements 2, 3, 4, and 5 have operating members of smaller dimensions and increasing length. This saves the need of any mechanical transmission parts. The housing possesses a window 29 at the front, behind which the transparent elements 2, 3, 4, and 5 and the ground element 1" are arranged.

The principle of a straight line form of the invention is shown in FIGS. 22, 23, and 24. All the data cited above for the invention executed in disc form are also seen to be valid in a suitably varied form for any straightlined design. FIG. 24 shows schematically the transparent elements in an exploded view.

Figure 25:
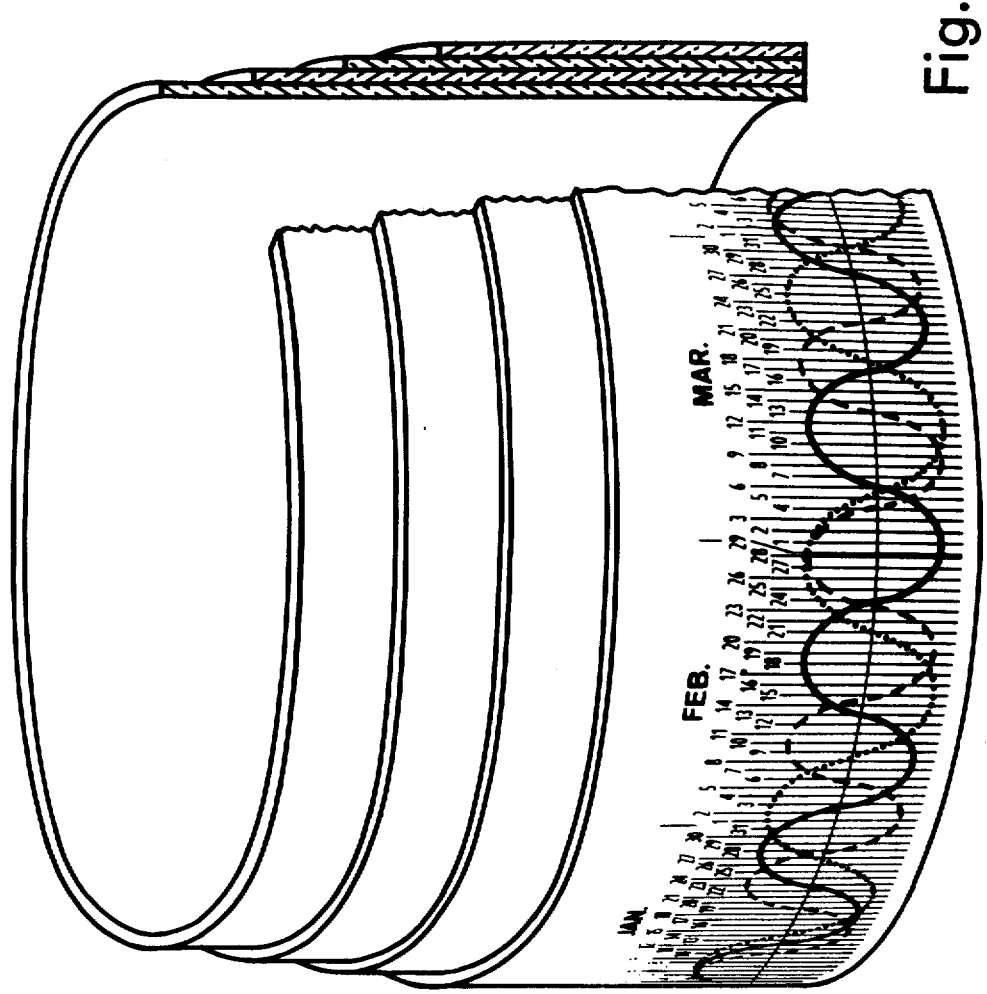
FIG. 25 shows a cylindrical form of a device, in part section.

In FIG. 25 the principle of the invention is represented in a cylindrical form of execution, consisting of several transparent rings of different diameter and different breadth, having grip zones for handling, apart from the diagram zones.

The basic principle of the invention can be varied in design in accordance with the purpose, with the available space, further in accordance with the number of records and the period lengths of the different curves. The most favorable form of execution is the circular form as shown in FIGS. 1, 2, 26, 29, because there are few tool costs, especially if the ground element 1 is made of threefold bristol board, printed and punched. The transparent elements 2, 3, 4, and 5 are made from plastic foil like cellulose acetate of 0.4 mm thickness, colorless, printed and punched. Another excellent material for the ground element would be electrical oxidized aluminum, printed and punched — but more expensive. Extrusion material, pressed, or moulded plastic can be used too, in this case the tool costs are expensive.

Figure 28:
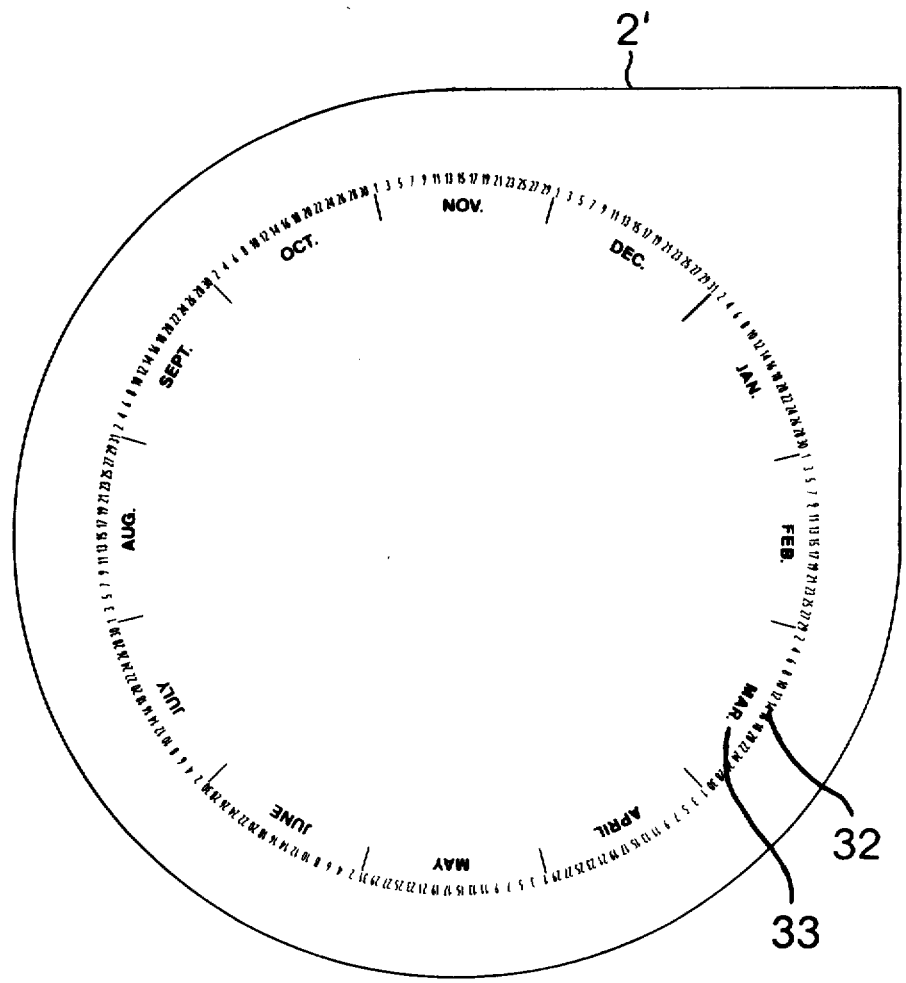
FIG. 28 shows the transparent element possessing the opaque date figures and months names arranged in a circle.
Figure 29:
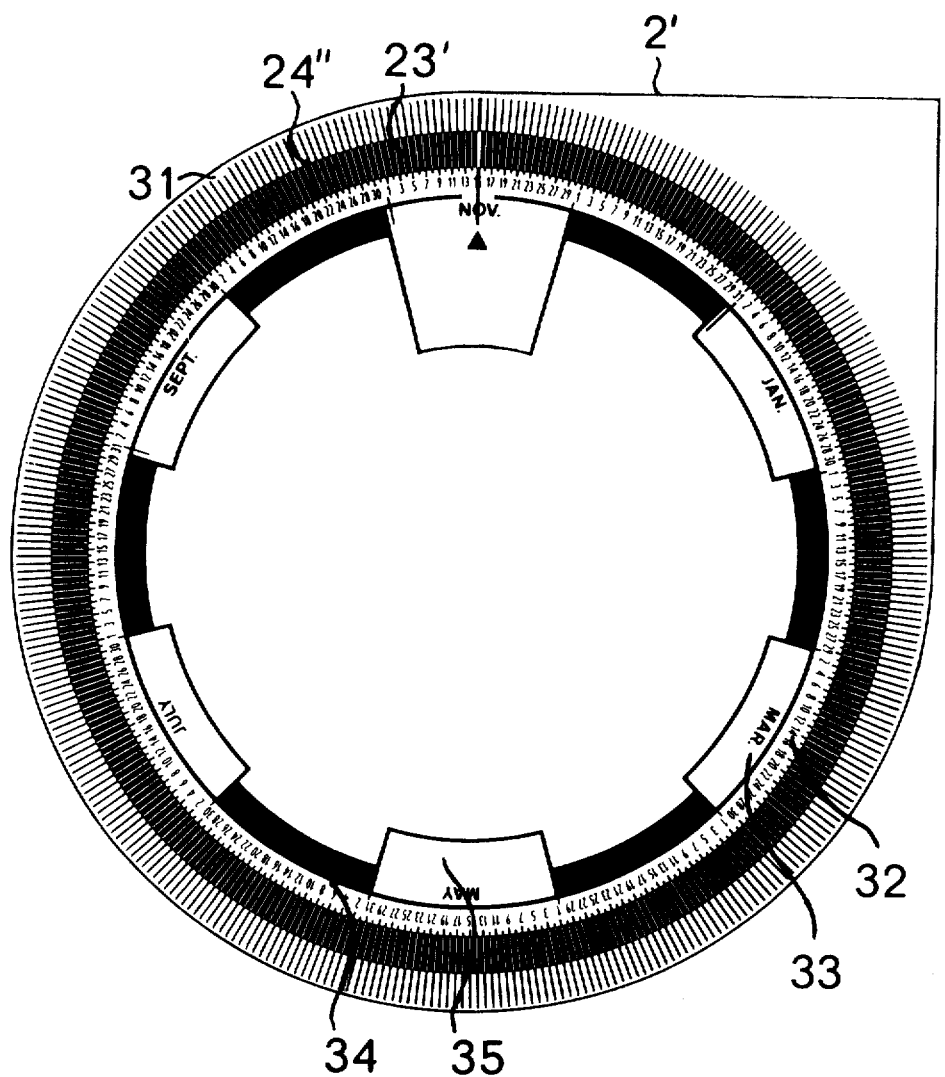
FIG. 29 shows the transparent element of FIG. 28 in its working position upon the special layout of the ground element of FIG. 27

In the FIGS. 28 and 29 numeral 31 refers to the divided diagram of the ground element, numeral 32 refers to the date figures, 33 refers to the names of the months. The colored zone 34 shall be covered by the months names 33, arranged on a transparent element 2'. Numeral 35 refers to white zone in the colored layout of the ground element. The zero line 24" and the zone 23' of negative phases can be seen in FIGS. 27 and 29.

The suitable division and subdivision of the scales is depending from the purpose for which the invention is used. The simultaneous evaluation of several cyclic processes, drawn in curves, can be used in several special fields like astronomy, physics, physiology, psychology and biology. Any desired scale unit can be used e.g. mikroseconds instead of days, milliseconds instead of years — the principle of the arrangement of the scales is the same, if e.g. a representation of superposition and interference of waves is desired.

An easy comprehensive example of cyclic processes is used for the accompanying drawings. The 28-day cycle of women together with the known cycles of 23 days and 33 days which are known under the name "biorhythm". The principle of the invention will be explained according to these three cyclic processes.

In the examples represented in the drawings, the transparent element 3 possesses an opaque record of 13 periods of a cyclic process (13 times 28 days = 364 days), the transparent element 4 shows 16 periods of a cyclic process (16 times 23 days = 368 days), and the transparent element 5 shows 11 periods of a further cyclic process (11 times 33 days = 363 days). In the space of a year 16 cycles of 23 days occur, 13 cycles of 28 days occur and 11 cycles of 33 days occur — but there is a difference between the three amounts (364, 368, 363 days) and the total of 365 days of a common year and 366 days of a leap year.

| CYCLE in days | Number of cycles | Amount in days | Difference in a common year | Difference in a leap year |
|---|---|---|---|---|
| 23 | 16 | 368 | + 3 days | + 2 days |
| 28 | 13 | 364 | − 1 day | − 2 days |
| 33 | 11 | 363 | − 2 days | − 3 days |

As shown in FIGS. 26 and 29 the circle of the date figures possesses the February 29th and is therefore divided in 366 small diagram intervals (sectors). The curves of the transparent elements are drawn to one endless line, i.e. the curves of different cycles are drawn all at the same length of 366 days instead of 368, 364 and 363 days. Such closed curve lines can be used in each position in reference to a scale which add the differences. The above listed differences have the following meaning:

The 23-day curve is drawn in 16 cycles of a total length of 366 days instead of 368 days. At the end of an elasped year the beginning of its 17th cycle should stand in the position 368 days (= 366 + 2 days), but actually stands in a device according to the invention in the position of 366 days only. The two missed days are now corrected by means of the peripherally arranged year scale — in this example by means of the scale D in FIG. 26. The correction is made clockwise in the direction "puls" for 2 days. The scale interval for one year is + 3 days in a commonyear and + 2 days in a leap year (366 days).

According to the natural sequence of three common years and one leap year the scale intervals are made analoguously: Three scale intervals of + 3 days and then one scale interval of + 2 days. The width of each scale interval depends on the radius of the scale and is for one day 1/366 of the circumference of said scale circle. In this manner the scale intervals are made in the sequence:

$$\frac{3}{366} \quad \frac{3}{366} \quad \frac{3}{366} \quad \frac{2}{366} \quad \frac{3}{366} \quad \frac{3}{366} \quad \frac{3}{366} \quad \frac{2}{366} \quad \frac{3}{366} \quad \frac{3}{366} \quad \frac{3}{366} \longrightarrow$$

This gives the scale D on the 23-day cycle in FIG. 26.

In a similar manner the other scales are made, but proceeding in the inverse direction, because there are minus values as listed above. For the scale C which is coordinated to the 33-day cycle, the respective differences are — 2days in each common year and — 3 days in each leap year. The correction is to be made anticlockwise (counterclockwise) in direction "minus". The scale intervals are in the sequence: Three intervals of — 2 days and one intervals of — 3 days. There is another radius of the scale and therefore another circumference. The interval for one day is 1/366 of the circumference of this circle. The scale intervals are $$\longleftarrow \frac{2}{366} \quad \frac{2}{366} \quad \frac{2}{366} \quad \frac{3}{366} \quad \frac{2}{366} \quad \frac{2}{366} \quad \frac{2}{366} \quad \frac{3}{366} \quad \frac{2}{366} \quad \frac{2}{366} \quad \frac{2}{366}$$

for the scale C of the 33 day-cycle.

In a similar manner the scale B for the 28-day cycle is made in the sequence $$\leftarrow \quad \frac{1}{366} \quad \frac{1}{366} \quad \frac{1}{366} \quad \frac{2}{366} \quad \frac{1}{366} \quad \frac{1}{366} \quad \frac{1}{366} \quad \frac{2}{366} \quad \frac{1}{366} \quad \frac{1}{366} \quad \frac{1}{366}$$

Broadly speaking: The difference of the total of a curve is corrected by shifting the transparent element with its setting mark in the respective direction (plus or minus) according to the sequence of common years and leap years and according to the fraction of the circumference of the coordinated scale circle, along a scale which is arranged peripherally.

The scales themselves show four types: Beginning with leap year interval, beginning with a common year interval, followed by a leap year interval, beginning with two common year intervals, followed by a leap year interval, beginning with three common year intervals, followed by a leap year interval. Four types of devices according to the invention are sufficient for all cases concerning the three biorhythm 23, 28, 33 day cycles.

At the beginning of a year the differences have the value of zero and increase continuously in course of the year until at the end of the year the differences have the whole values as listed above. In all cases in which the interval width is big, a subdivision of such interval is useful, a subdivision in six small parts giving intervals of 2 months each. The correction can also be made for 2 months and if the setting mark is positioned carefully between two little scale intervals, it is possible, to set the difference for each month with full accuracy. In FIGS. 26 and 29 the scale 32 with the date figures includes the intercalary day "Feb. 29th". In common years the 29th is skiped and the date scale is set for one day interval counterclockwise at the March 1st, instead of Feb. 29th. This is made, when the desired date is lying in the range between Mar. 1st and the date setting mark "A" on the ground element.

Another possibility is to divide the whole device instead of 366 days generally in 365 days. In this case the fractions for the scale intervals are $$\frac{1}{365} \quad \frac{2}{365} \quad \frac{3}{365}$$

instead of $$\frac{1}{366} \quad \frac{2}{366} \quad \frac{3}{366}$$

of the circumference of the three scales circles with different radii. In thic case the intercalary day "February 29th" occurs never in the date scale. In common years date correction is needless, in leap years the 28th of February is set two times, i.e. if the desired date to be read in respect to the curves lies in the range between the March 1st and the setting mark "A" of the ground element, the date scale 32 of FIG. 28 is moved in clockwise direction for one day. Such division in 365 parts is advantageous because a correction of the date has to be made only each fourth year. The division of the device in 366 parts demand for correction in each of the three common years.

For the use of the device the knowledge of the phase positioning of all (e.g. three) cyclic processes at a certain point in time is necessary. The date scale is then set for this (known) point in time — by so doing the zero point for all further settings has already been chosen. The space elapsed since that point in time then is set on the year scales B, C, D. By means of the above explained sequence of the scale intervals and their different sizes the leap years are automatically accounted — the setting is finished. Readings of phase position can be taken for the desired point in time and the course of cyclic processes before and after the desired point in time can be reviewed. Hatchings help to recognize any overlapping easily.

FIG. 26 shows an exemplified setting. The known point in time is the date of birth "November, 16th" — at this day all three cycles of the biorhythm of the respective person had the amplitude zero and began their first positive phase. Moving the transparent element "A" possessing the date scale, the date of "November, 16th" is set at the setting mark "A" of the ground element. The setting mark consists of a vertical line connecting a black and a white triangle on the ground element. Space elapsed since equals 30 years and 4 months (the actual age of the person). Each setting mark of the three transparent elements B, C, and D is set at the scale point "30 years, 4 months". The three curves are now in the right position for the desired date "4 months after the November, 16th" and this date is "March 16th". The index line 30 is set at "March, 16th" and the setting is finished. The course of the three cyclic processes shows that all three curves are in the negative phases near the minimum.

For certain purposes the device can be used with scale division for the astronomic year (365.2422 days) or for the so-called tropic sun-year (365.256358 days). In FIGS. 1 and 11 such layout with subdivision in 365.25 days can be seen. For very exact purposes the diameter of the device can be extended e.g. four times and a long date scale consisting of 3 consecutive common years and 1 leap year can be made. Such devices can be used for astronomical purposes and are provided for even longer time intervals.

The principle of the present invention is not limited to the forms of execution illustrated in the figures of the accompanying drawings, but includes all variations and combinations.

What I claim is:

1. A device for the joint evaluation of several cyclic processes using a plurality of transparent disc members superposed over each other and a base member, all members movable about a common axis, the improvement comprising
    a. an opaque round ground element carrying several year scales of different length, each of said year scales subdivided into intervals from 0 to 100 years, said year scales proceeding from a joint zero line in two directions,
    b. a first transparent element carrying an opaque date scale for one year, said date scale co-acting with said joint zero line of said ground element,
    c. a second transparent element coordinated to the first year scale of said ground element and having a setting mark co-acting only with said first year scale and further carrying consecutive cycles drawn as a continuous curve, d. a third transparent element coordinated to the second year scale of said ground element and having a setting mark co-acting only with said second year scale and further carrying consecutive cycles drawn as a continuous curve, e. a fourth transparent element coordinated to the third year scale of said ground element and having a setting mark co-acting only with said third year scale and further carrying consecutive cycles drawn as a continuous curve, f. means for securing together all of the said elements for movement about a common axis.

2. A device as in claim 1, comprising apart from the continuous curves hatching zones to mark certain points of said continuous curves, thus creating noticeable darker places when at least two of said hatching zones, arranged on the transparent elements carrying said continuous curves, mask each other.

3. A device for the joint evaluation of several cyclic processes using three transparent discs carrying cyclically-varying curves superposed over each other and over a base member, all movable about a common axis, the improvement comprising a. an opaque disc-shaped ground element serving as base member and carrying three different year scales proceeding from a joint radial zero line, one of these year scales proceeding in opposite directions to the others, each of said year scales showing intervals from 0 to 100 years, and showing differences in the interval width of those scale intervals which are coordinated to each leap year — according to the natural sequence of three common years and one leap year, b. a first transparent element showing an opaque date scale for one year, subdivided into 365.25 days of the astronomical year and co-acting with said joint radial zero line of said ground element, c. a second transparent element showing an opaque periodically varying circular curve, but being coordinated to the first year scale of said ground element by means of a setting mark co-acting only with said first year scale, d. a third transparent element showing an opaque periodically-varying circular curve, but being coordinated to the second year scale of said ground element by means of a setting mark co-acting only with said second year scale, e. a fourth transparent element showing an opaque periodially-varying circular curve, but being coordinated to the third year scale of said ground element by means of a setting mark co-acting only with the said third year scale, f. means for securing together all of the said elements for movement about a common axis.

4. A device for the joint evaluation of several cyclic processes using three transparent discs showing periodically-varying curves superposed over each other and a base member, all movable about a common axis, the improvement comprising a. a ground element carrying a radial zero line only, b. a first transparent element showing an opaque date scale co-acting with said radial zero line of said ground element, said date scale for one year subdivided into 365.25 days according to the astronomical year, c. a second transparent element showing its own opaque year scale from 0 to 100 years co-acting with said radial zero line of said ground element, and further carrying consecutive cycles drawn as continuous curve, d. a third transparent element showing its own opaque year scale from 0 to 100 years co-acting with said radial zero line of said ground element, and further carrying consecutive cycles drawn as continuous curve, e. a fourth transparent element showing its own opaque year scale from 0 to 100 years co-acting with said radial zero line of said ground element, and further carrying consecutive cycles drawn as continuous curve, f. a split rivet for securing together all of the said elements for movement about a common axis.

* * * * *